(12) United States Patent
Speth et al.

(10) Patent No.: US 11,065,591 B2
(45) Date of Patent: Jul. 20, 2021

(54) METHOD AND REACTOR FOR PERFORMING EXOTHERMIC REACTIONS

(71) Applicant: Haldor Topsøe A/S, Kgs. Lyngby (DK)

(72) Inventors: Christian Henrik Speth, Lynge (DK); Tommy Lykke Wind, Allerød (DK); Uffe Bach Thomsen, Vedbæk (DK); Anders Helbo Hansen, Espergærde (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/764,301

(22) PCT Filed: Dec. 19, 2018

(86) PCT No.: PCT/EP2018/085895
§ 371 (c)(1),
(2) Date: May 14, 2020

(87) PCT Pub. No.: WO2019/121949
PCT Pub. Date: Jun. 27, 2019

(65) Prior Publication Data
US 2020/0368706 A1  Nov. 26, 2020

(30) Foreign Application Priority Data

Dec. 20, 2017 (DK) .............. PA 2017 00733

(51) Int. Cl.
*B01J 8/00* (2006.01)
*B01J 8/04* (2006.01)
*C01C 1/04* (2006.01)

(52) U.S. Cl.
CPC .............. *B01J 8/0469* (2013.01); *B01J 8/008* (2013.01); *B01J 8/0496* (2013.01); *C01C 1/0417* (2013.01); *B01J 2208/0015* (2013.01)

(58) Field of Classification Search
CPC ....... B01J 8/00; B01J 8/008; B01J 8/02; B01J 8/04; B01J 8/0446; B01J 8/0461; B01J 8/0469; B01J 8/0496; B01J 2208/00; B01J 2208/00008; B01J 2208/00017; B01J 2208/00106; B01J 2208/00115; B01J 2208/0015; C01C 1/00; C01C 1/02; C01C 1/04; C01C 1/0405; C01C 1/0417
See application file for complete search history.

(56) References Cited

U.S. PATENT DOCUMENTS

| | | | |
|---|---|---|---|
| 3,663,179 A | 5/1972 | Mehta et al. | |
| 4,298,589 A | 11/1981 | LeBlanc et al. | |
| 4,789,527 A * | 12/1988 | Osman | B01J 8/0005 165/66 |
| 5,052,482 A | 10/1991 | Gondouin | |

(Continued)

FOREIGN PATENT DOCUMENTS

| | | |
|---|---|---|
| CN | 102872767 A | 1/2013 |
| EP | 0 080 270 A2 | 6/1983 |
| EP | 0231683 A1 | 8/1987 |

(Continued)

*Primary Examiner* — Natasha E Young
(74) *Attorney, Agent, or Firm* — Blank Rome LLP

(57) ABSTRACT

A method and reactor for performing exothermic reactions with parallel operated catalyst modules arranged in stacked order within a pressure shell and adapted to axial flow of process gas through one or more catalyst layers and at least one catalyst layer cooled by an intrabed heat exchanger.

32 Claims, 5 Drawing Sheets

(56) References Cited

U.S. PATENT DOCUMENTS 7,081,230 B2 * 7/2006 Blanchard .............. B01J 8/0469
422/148
2012/0237415 A1 9/2012 Ramos et al.

FOREIGN PATENT DOCUMENTS

| EP | 0 931 586 A1 | 7/1999 | | |
|---|---|---|---|---|
| EP | 1 419 813 A1 | 5/2004 | | |
| EP | 1 477 220 A1 | 11/2004 | | |
| EP | 1 623 755 A1 | 2/2006 | | |
| EP | 2 070 590 A1 | 6/2009 | | |
| EP | 3115338 A1 * | 1/2017 | ............ | B01J 8/0496 |
| RU | 2 608 092 C2 | 1/2017 | | |
| WO | WO 03/031048 A1 | 4/2003 | | |
| WO | WO 2004/035198 A1 | 4/2004 | | |
| WO | WO 2006/010565 A1 | 2/2006 | | |
| WO | WO 2009/106231 A1 | 9/2009 | | |
| WO | WO 2011/124442 A1 | 10/2011 | | |

\* cited by examiner

B-B
C

A-A
B

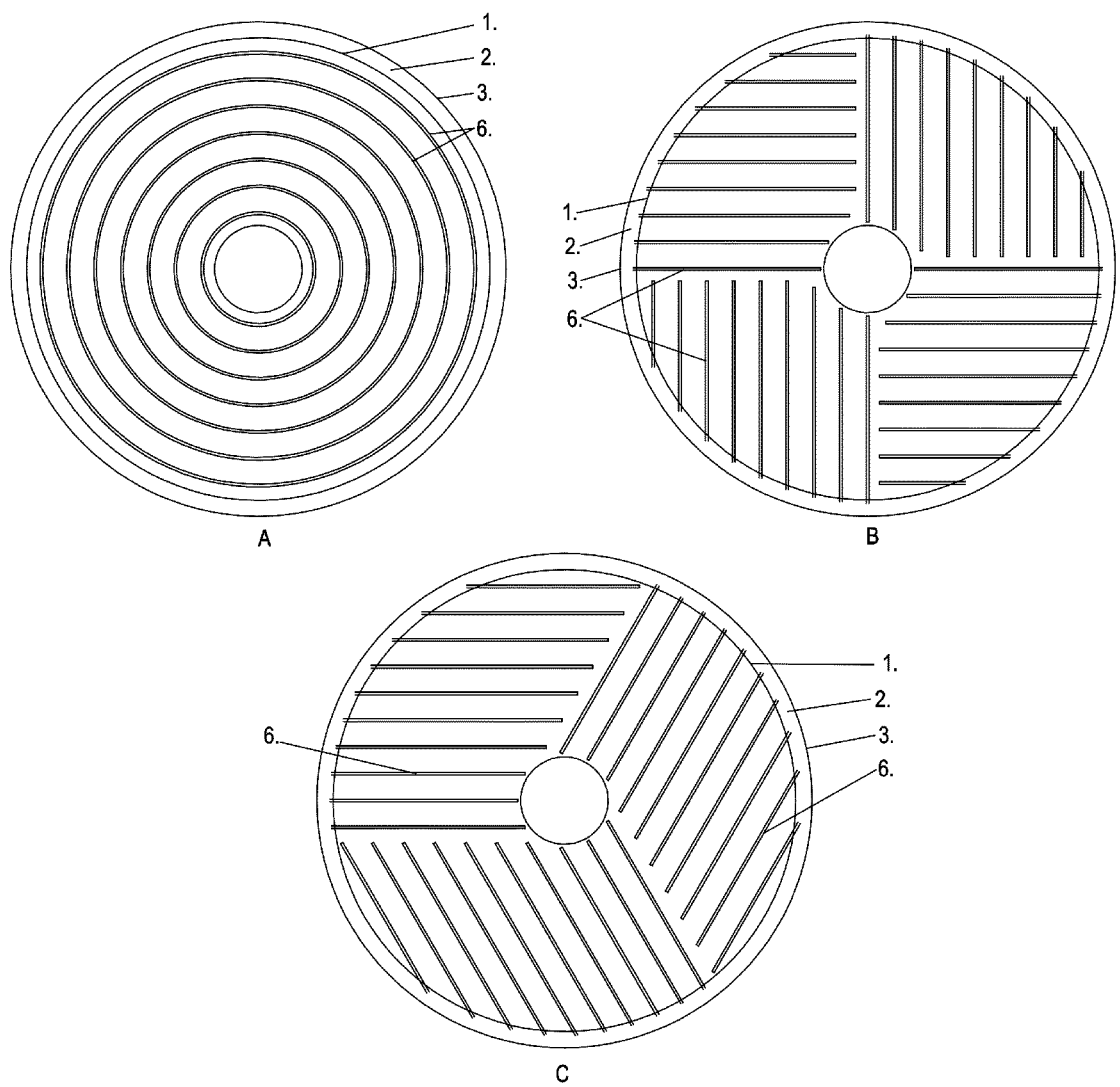

METHOD AND REACTOR FOR PERFORMING EXOTHERMIC REACTIONS

This is a national stage of International Application No. PCT/EP2018/085895, filed Dec. 19, 2018, published as WO2019/121949, which claims priority to Danish Patent Application No. PA 2017 00733, filed on Dec. 20, 2017.

BACKGROUND OF THE INVENTION

Ammonia is of substantial importance for feeding the worlds growing population through its application as feedstock to fertilizer production. Historically, the Tennessee Valley Authority (TVA) type converter was for decades the preferred reactor type for ammonia synthesis and gained foothold already the 1930ies. It is characterized by utilizing axial flow in a single gas cooled catalyst bed. Cooling of the catalyst is obtained by a number of tubes placed vertically in the catalyst bed, ensuring reaction conditions in favor of conversion of an exothermic reaction. Despite a large number of references for this converter type, the design suffered from three important limitations; I) the pressure drop over a single converter escalated as plant capacity increased resulting in high energy consumption, II) high construction costs to build parallel converters in separate pressure shells to overcome the challenge of high pressure drop and III) high re-circulation rates (and loop pressures) were generally required to compensate for the mediocre conversion of hydrogen and nitrogen per reactor pass.

To comply with a general trend towards building larger single-line capacity plants after the second world war, the idea of utilizing adiabatic radial flow in fixed catalyst beds was introduced. Especially from the 1960ies and forward the radial flow converter gained increasing market shares at the expense of the TVA converter. The common denominator of radial flow reactors is that they generally provide larger cross sectional area for flow and thereby lower average gas velocity as opposed to the cross sectional area and gas velocity obtained by axial flow through the same catalyst mass. This realization facilitated significantly higher ammonia production rates in a single converter and pressure shell while maintaining the pressure drop over the converter below 3 bar. Furthermore, to increase conversion, lowering the required recirculation rate of the loop, quenching of the product gas from a first adiabatic bed by fresh process gas was introduced in the 1960ies by Haldor Topsoe' S-100 converter. The combined quenched stream was then further converted in a second adiabatic bed connected in series with the first bed. Radial flow was applied in both catalyst beds.

Further advancements of the radial flow converter emerged by the S-200 converter during the 1980ies and the S-300 converter around year 2000. Instead of quenching, these reactors are equipped with a single or two interbed heat exchangers respectively to provide cooling in-between two or three catalyst beds operated in series, each bed being adiabatic and taking advantage of the radial flow principle. Similar designs include Casale' axial-radial flow converter which also relies on adiabatic fixed catalyst beds operated in series and with interbed heat exchange. The above-mentioned interbed heat exchanger(s) serves the purpose of generating thermodynamic potential for additional conversion of the exothermic reaction after each catalyst bed while simultaneously preheating the incoming fresh process gas to the converter prior to reaching the first catalyst bed.

Any improvement related to ammonia reactors must compare its performance to a two or three bed adiabatic converter with radial flow and interbed heat exchange since this converter type is still the preferred choice for large scale ammonia plants.

Though serial adiabatic converters with radial flow and interbed heat exchange are still dominant in the market further steps of improvement can be made. It is well-known that the efficiency of a catalyst for any exothermic reaction can be improved by cooling the catalyst to an extent resulting in an operation curve following the maximum reaction rate curve of the given reaction. An adiabatic reactor, providing no cooling, suffers from part of the catalyst mass operating at colder conditions than optimum while other parts of the catalyst bed operates at hotter conditions than optimum. Hence, a natural evolution was made by Casale which introduced a flow converter where cooling of the catalyst bed is obtained by the use of cooling plates wherein some kind of cooling fluid is heated. Such a converter type may in principle provide a higher conversion per catalyst volume due to improved reaction conditions of the catalyst relative to that obtained in an adiabatic bed. This concept is described through a number of patents, such as U.S. Pat. Nos. 6,946,494 and 9,028,766. All these patents, describe cooling plates placed in a radial layout inside a cylindrical converter shell and use of radial flow in the catalyst bed to obtain low pressure drop over the catalyst.

Though the above-mentioned prior art, applying radial flow and radial cooling plate layout, provide means to improve the catalytic efficiency of an exothermic reaction, this solution suffers from four main drawbacks; I) the nature of the radial cooling plate layout implies varying distance between the cooling plates and thus variable thickness of the catalyst layer located in-between two adjacent cooling plates, consequently resulting in an undesirable cooling profile through the catalyst bed.

In detail, the chemical exothermic reaction is cooled too weakly near the outer radius of the catalyst bed since the distance between the cooling plates are here higher than optimum while the reaction is cooled too strongly near the inner radius of the catalyst bed where the distance between the cooling plates is at its minimum. The associated flux profile provides a non-optimal operation curve and limited specific catalytic production rate. Moreover, II) the retention of the radial flow principle implies high vertical catalyst beds, yielding high catalyst forces on the mechanical parts of the converter and risk of failures, III) the large catalyst volume applied in each bed of a radial flow converter requires catalyst loading from inside the converter after installation of the hardware which yields long installation time and IV) unloading of catalyst placed in-between the cooling plates is particular problematic in the bottom of a cooled radial flow converter due to the long cooling plates applied.

SUMMARY OF THE INVENTION

The invention relates to a highly efficient method for performing exothermic catalytic reactions such as, but not limited to, ammonia or methanol synthesis. The invention discloses innovative steps taken to improve the reaction conditions of the applied catalyst. Also, the invention provides a stackable concept for fast installation, easy loading and unloading of catalyst, allows high conversion yields in large capacity chemical plants with low investment costs and high energy efficiency while still overcoming the limitations of the prior art. The above-mentioned technical problems of the prior art are solved according to the invention, by;

A method for performing exothermic catalytic reactions comprising the steps of passing a fresh process gas in parallel to at least two cylindrical catalyst modules, each containing a cooled catalyst zone holding a catalyst bed and an intrabed heat exchanger.

Exothermically converting the fresh process gas, as it flows in axial flow direction through the catalyst bed in each of the catalyst zones, to a product gas.

In each of the parallel operated cylindrical catalyst modules, cooling the exothermic reaction by passing fresh process gas from an outer annular space, formed around each of the cylindrical catalyst modules, into the intrabed heat exchanger and passing the fresh process gas through the intrabed heat exchanger in indirect heat exchange with the reacting process gas flowing in axial direction through the cooled catalyst zone. The cooled catalyst zone of each module may optionally be connected in series with one or more adiabatic catalyst zones, above and/or below the cooled catalyst zone.

The intrabed heat exchanger of each module is made of a plurality of vertically aligned heat exchange units forming flow compartments for the fresh process gas in the intrabed heat exchanger. Each heat exchange unit contains horizontally placed feed means arranged to transport fresh process gas from an outer annular space, formed around each of the cylindrical modules, into the heat exchange unit wherein the fresh process gas is heated as it passes through the heat exchange unit by taking up reaction heat from the exothermic reaction in the cooled catalyst zone. The preheated fresh process gas leaves the heat exchange unit in the opposite end of the said feed means after which it is transported to the upper catalyst zone, being either adiabatic or cooled. The flow pattern in each heat exchange unit of the intrabed heat exchanger is preferably axial and counter current or co-current with the flow in the catalyst zones.

In an embodiment of the invention the said heat exchange units of each intrabed heat exchanger consists of elongated plate-shaped structures, like pillow plates, referred to as cooling plates. A cooling plate is generally made of two spaced thin steel sheets, the space inside the cooling plate between the two steel sheets constitutes a channel in which the fresh process gas flows. Catalyst is arranged between the cooling plates. The product gas from each cylindrical catalyst module is preferably passed from the lowermost catalyst zone to a central space formed centrally within the two or more catalyst modules when stacking the modules inside the pressure shell.

The invention discloses also the possibility to apply a parallel cooling plate layout, wherein the distance between two adjacent cooling plates is the same within ±10% and preferably wherein each cooling plate is essentially planar and of the pillow plate type.

In a further embodiment of the invention, additional means are introduced to supply preheated process gas, coming for example from an internal or external start-up heater, to the catalyst loaded in the cylindrical catalyst modules. These means, referred to as the direct inlet gas system, may serve as an important tool to enable reduction of catalyst during the initial start-up of the converter. The said direct inlet gas system is arranged to bypass the outer annular space, located in-between the outer pressure shell and the cylindrical catalyst modules. This allows introduction of preheated process gas during catalyst reduction which would otherwise exceed the design temperature of the pressure shell. Without the direct inlet gas system, the possible temperature level of the catalyst would in many cases be limited due to the above-mentioned design temperature, resulting in a prolonged and inefficient reduction period.

In a further embodiment of the invention, the direct inlet gas system is also utilized to supply fresh non-preheated process gas to the catalyst contained in the cylindrical catalyst modules during normal operation of the converter, i.e. after initial reduction of the catalyst. The flow of process gas through the direct inlet gas system may be controlled by one or more valves located outside the converter. This system enables control of the temperature level of the catalyst during normal operation. For example, during the initial period of the catalyst lifetime, where the catalyst activity is at its maximum, or during reduced load (reduced feed flow) to the converter, the fraction of feed gas introduced through the direct inlet gas system can be increased to cool the catalyst being heated by the exothermic reaction. Similarly, as the catalyst deactivates and/or the converter load is raised, the fraction of feed gas sent through the direct inlet gas system may be reduced to allow enhanced preheating of the remaining feed gas being passed through the intrabed heat exchanger of each catalyst module. The utilization of the said direct inlet gas system for both scenarios, heating during the reduction period and temperature control during normal operation, ensures optimal utilization of the available converter volume instead of designing the converter internals with two separate means/systems to supply preheated and fresh non-preheated process gas respectively.

Advantageously, contrary to the prior art, it has been surprisingly found that the invention, utilizing axial flow in the catalyst zone(s) of the parallel operated modules, allows cooling plates to be placed in parallel layout inside the cooled catalyst zone. This important realization ensures fixed thickness of the catalyst layer located in-between two adjacent cooling plates, as obtained by the preferred choice of parallel cooing plates. It provides homogeneous cooling of the catalyst in the cooled catalyst zone and consequently improved reaction conditions and catalytic efficiency relative to the reaction conditions obtained with the prior art.

A further improvement secured by the present invention relates to the fact that the described combination of I) parallel operated catalyst modules, II) axial flow through the catalyst zones and III) preheating of feed gas obtained by intrabed heat exchange in the cooled catalyst zone, ensures the possibility to load significantly more catalyst into the pressure shell of a given chemical plant. Thus, a more efficient utilization of the available pressure shell volume is obtained by the new invention. The combination of improved catalytic efficiency, obtained by constant catalyst layer thickness by parallel cooling plates, and higher catalyst loading volume ensures a further synergetic effect on the maximum production rate possible within a fixed sized pressure shell. This is of outmost importance in revamp cases focusing on capacity increase where the converter is replaced while the original pressure shell is maintained.

Another advantage of the invention is that despite axial flow through all catalyst zones, the total converter pressure drop may be kept as low as 1 kg/cm2 or less. This is feasible due to the choice of parallel flow pattern of the modules lowering the gas velocity in the catalyst zones.

Also, the described method of passing fresh process gas from an outer annular space, located in-between the outer pressure shell and the cylindrical catalyst modules, into the intrabed heat exchanger is an effective and smart feature of ensuring cooling of the pressure shell which has often a low design temperature and must therefore be shielded from the exothermic reaction taking place in the catalyst zones of the parallel operated catalyst modules.

Another important feature of the invention, is the fact that the modules, operating in parallel, are highly flexible regarding size by simply adjusting the number of modules for a given chemical plant and the desired capacity. This allows catalyst loading outside the pressure shell and lifting of the modules, having reduced weight and pre-loaded catalyst, directly into the pressure shell. This accounts for extraordinary value propositions regarding reduced downtime due to fast catalyst loading and fast installation time of hardware, obtained by the truly stackable concept of the catalyst modules. Finally, the invention provides shorter vertical catalyst bed height by increasing the number of catalyst modules yielding significantly reduced catalyst forces on the mechanical parts and reduced risk of failures.

A further important advantage of shorter catalyst bed height is easier unloading of catalyst.

In summary the aspects and features of the present invention are:

1. A method of performing exothermic catalytic reactions comprising the steps of passing a fresh process gas in parallel to at least two cylindrical catalyst modules arranged in stacked order, each containing in series one or more catalyst zones, at least one of the catalyst zones is cooled by an intrabed heat exchanger;

exothermically reacting the fresh process gas flowing in axial flow direction through all of the catalyst zones to a product gas;

in each of the cylindrical catalyst modules, cooling the exothermic reacting process gas with the fresh process gas and thereby preheating the fresh process gas by passing the fresh process gas from an outer annular space formed around each of the cylindrical catalyst modules into the intrabed heat exchanger and passing the fresh process gas through the intrabed heat exchanger in indirect heat exchange with the exothermic re-acting preheated process gas passing in axial flow direction through the cooled catalyst zone; and collecting the product gas withdrawn from the at least two catalyst modules in a central space formed centrally within the at least two stacked catalyst modules.

2. The method of feature 1, wherein at least one of serial connected catalyst zones is an adiabatic catalyst zone.

3. The method of feature 1, wherein the process gas from a single cooled catalyst zone is passed in series through a single adiabatic catalyst zone.

4. The method of any one of features 1 to 3, wherein the intrabed bed heat exchanger comprises a plurality of cooling plates forming flow compartments for the fresh process gas in the intrabed heat exchanger.

5. The method of feature 4, wherein the thickness of the cooled catalyst layer between two adjacent cooling plates varies within ±10%.

6. The method of feature 5, wherein the thickness of the cooled catalyst layer between two adjacent cooling plates is between 10 and 300 mm.

7. The method of feature 6, wherein the thickness of the cooled catalyst layer between two adjacent cooling plates is between 20 and 150 mm.

8. The method of any one of features 5 to 7, wherein each of the cooling plate is essentially planar.

9. The method of any one of features 5 to 8, wherein the cooling plates are arranged in three 120° sections in the cylindrical catalyst modules and wherein all cooling plates in each 120° section are essentially planar and parallel.

10. The method of feature 9, wherein the essentially planar cooling plates in any of the three 120° sections are non-parallel to the essentially planar cooling plates in another section.

11. The method of any one of features 1 to 10, wherein the fresh process gas is passed through the intrabed heat exchanger in counter-current flow or in co-current flow with the process gas passing through the catalyst zones in each of the cylindrical catalyst modules.

12. The method of any one of features 1 to 11, wherein the fresh process gas is passed through the intrabed heat exchanger in counter-current flow with the process gas passing through the catalyst zones in each of the cylindrical catalyst modules.

13. The method of any one of features 1 to 12, wherein the cylindrical catalyst modules have the same size.

14. A reactor for performing exothermic reactions, comprising within a cylindrical pressure shell at least two parallel operated cylindrical catalyst modules arranged in stacked order, each containing in series one or more catalyst zones with a catalyst layer adapted to axial flow, the catalyst layer in the at least one of the catalyst zones is cooled by an intrabed heat exchanger;

an outer annular space between the cylindrical catalyst modules and the cylindrical pressure shell fluidly connected to the at least two parallel cylindrical catalyst modules;

in the at least one cooled catalyst zone feed means for the fresh process gas into the in-let of the intrabed heat exchanger, fluidly connected to the outer annular space;

the outlet of the intrabed heat exchanger is formed by open ends of the intrabed heat exchanger in the at least one cooled catalyst zone;

covers closing the at least two parallel cylindrical catalyst modules; and outlet means from the at least two parallel cylindrical catalyst modules.

15. The reactor of feature 14, wherein the outlet means from the at least two parallel cylindrical catalyst modules is arranged in a central space formed centrally within the at least two stacked catalyst modules.

16. The reactor of feature 14 or 15, wherein at least one of the serial catalyst zones is an adiabatic catalyst zone.

17. The reactor of any one of features 14 to 16, having a single cooled catalyst zone connected in series with a single adiabatic zone.

18. The reactor of any one of features 14 to 17, wherein the intrabed bed heat exchanger is a plate heat exchanger with a plurality of cooling plates forming flow compartments for fresh process gas in the intrabed heat exchanger.

19. The reactor of feature 17, wherein the thickness of the cooled catalyst layer between two adjacent cooling plates varies within ±10%.

20. The reactor of feature 19, wherein the thickness of the cooled catalyst layer between two adjacent cooling plates is between 10 and 300 mm.

21. The reactor of feature 19, wherein the thickness of the cooled catalyst layer between two adjacent cooling plates is between 20 and 150 mm.

22. The reactor of any one of features 18 to 21, wherein each of the cooling plates is essentially planar.

23. The reactor of any one of features 18 to 22, wherein the cooling plates are arranged in three 120° sections in the cylindrical catalyst modules and wherein all cooling plates in each 120° section are essentially planar and parallel.

24. The reactor of feature 18 to 22, wherein the cooling plates are arranged in three 120° sections in the cylindrical catalyst modules and wherein the essentially planar cooling plates in any of the three 120° sections are non-parallel to the essentially planar cooling plates in another section.

25. The reactor of any one of features 14 to 24, wherein the cylindrical catalyst modules have the same size.

26. The reactor of any one of features 17 to 25, wherein the cooling plates are in the form of pillow plates.

27. The reactor of any one of features 14 to 26, wherein the inlet to the intrabed heat exchanger is provided with gas feed means fluidly connected to the outer annular space.

28. The reactor of any one of features 14 to 27, wherein the outlet means from the lower most catalyst zone in each of the at least two parallel operated cylindrical catalyst modules are fluidly connected to a central space formed centrally within the at least two stacked catalyst modules.

29. The reactor of any one of features 14 to 28, wherein the reactor contains additional inlet means for supply of a further stream of preheated process gas.

30. The reactor of feature 29, wherein the means for supply of the further stream of preheated process gas is arranged to bypass the outer annular space and the intrabed heat exchanger.

31. The reactor of any one of features 14 to 30, wherein the reactor contains means for supply of a further stream of fresh process gas.

32. The reactor of feature 30, wherein the means for supply of the further stream of fresh process gas is arranged to bypass the outer annular space and the intrabed heat exchanger.

The features and advantages of the invention will be more evident with the following description of the Figures and specific embodiments.

DESCRIPTION OF THE FIGURES

FIG. 5A to C show examples of possible cooling plate layouts of cylindrical catalyst modules wherein the intrabed heat exchanger of each module is built from a plurality of cooling plates.

DETAILED DESCRIPTION OF THE INVENTION

Figure 1:
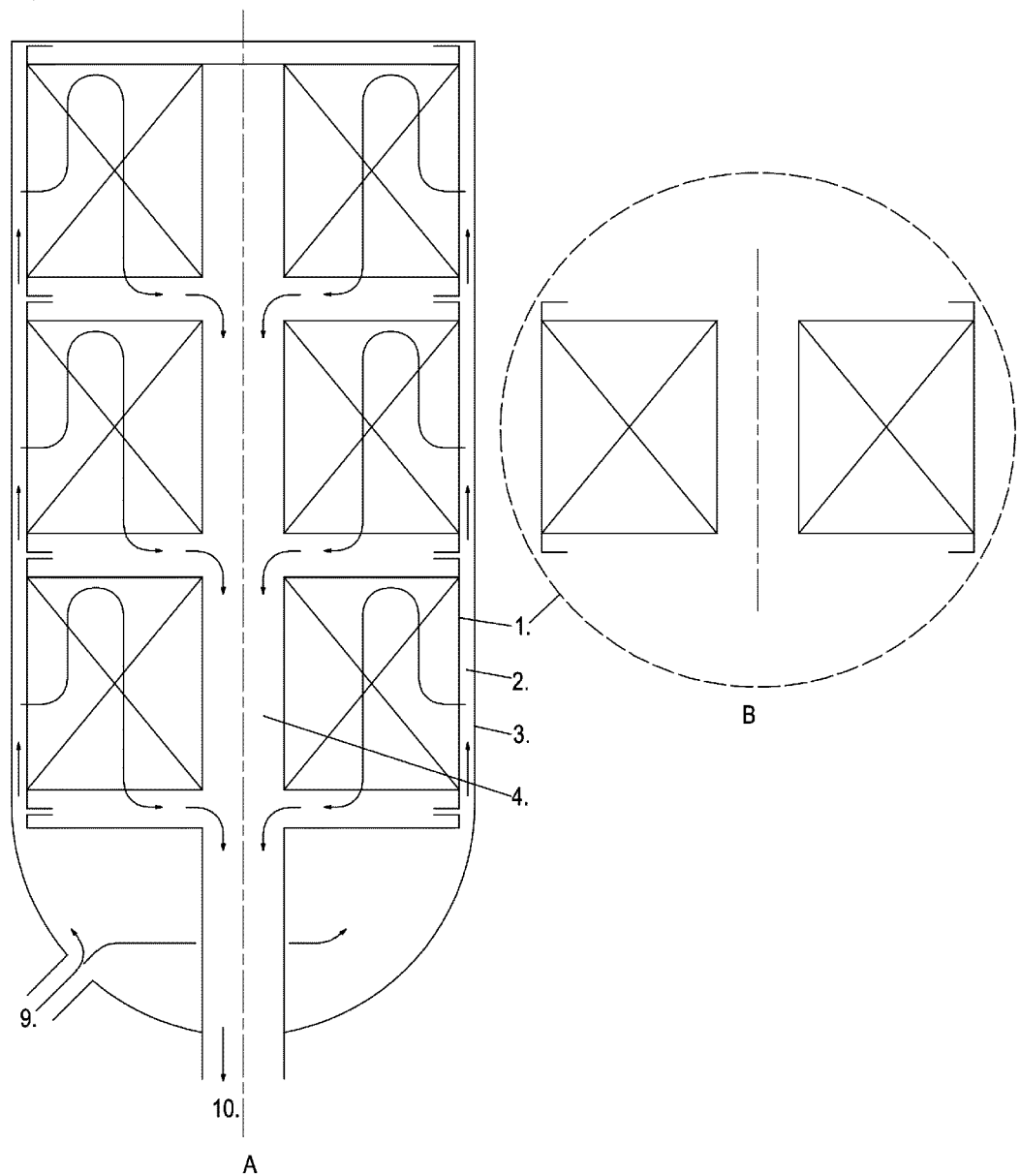
FIG. 1 is a simplified cross section of a catalytic converter showing three stacked cylindrical catalyst modules, operating in parallel inside a common pressure shell.

The invention describes a method of performing exothermic catalytic reactions wherein fresh process gas is passed in parallel to at least two cylindrical catalyst modules arranged in stacked order. FIG. 1 shows an example of the concept by the cross section of a catalytic converter having three stacked cylindrical catalyst modules 1, operating in parallel inside a common pressure shell 3. In this figure, fresh process gas 9 enters the pressure shell in the bottom, it flows in upwards axial direction in the outer annular space 2, located in-between the outer pressure shell 3 and the cylindrical catalyst modules 1. The fresh process gas enters each of the cylindrical catalyst modules, in each module passing an intrabed heat exchanger (not shown) wherein the fresh process is preheated before it flows in axial direction downwards through a cooled catalyst zone and optionally one or more adiabatic catalyst zones (the zones not shown in detail). The product gas from the lowermost catalyst zone of each cylindrical catalyst module is passed to a central space 4 formed centrally within the two or more catalyst modules when stacking the modules inside the pressure shell. In the figure, the combined product gas from the converter 10 is withdrawn from the bottom of the pressure shell.

Figure 2:
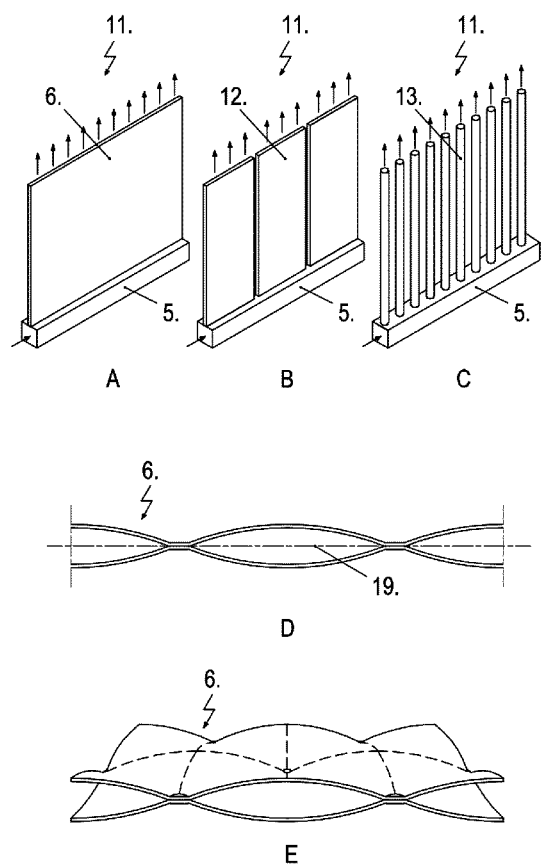
FIG. 2A to C show three examples of heat exchange units from which an intrabed heat exchanger can be built.
FIGS. 2D and E show examples of cooling plate types from which a heat exchange unit can be built.

FIG. 2 shows three examples of heat exchange units 11 from which an intrabed heat exchanger can be built. FIG. 2A is one example where each heat exchange unit 11 consists of feed means 5 and a cooling plate 6. FIG. 2B displays the same principle as in FIG. 2A, with feed means 5, but in this case the heat exchange unit 11 is built from a number of more narrow cooling plate parts 12. FIG. 2C is a third example of a heat exchange unit 11 where feed means 5 are connected to cooling pipes 13. In each case depicted in FIG. 2A to C, feed means 5, located in the bottom of each heat exchange unit 11, provides even distribution of the fresh process gas along the width of the cooling plate 6 after which the fresh process gas flows in axial upwards direction through the heat exchange unit 11.

The invention is not limited to the above examples of heat exchange units depicted in FIG. 2A to C. Other geometries than cooling plates 6, more narrow cooling plate parts 12 or cooling pipes 13 can be used and the feed means 5 can alternatively be placed above these in order to provide downwards axial flow of fresh process gas inside each heat exchange unit 11. FIGS. 2D and E show examples of cooling plate types from which a heat exchange unit can be built. The cooling plate 6 depicted in FIGS. 2D and E is of the pillow plate type. A symmetry line 19 is indicated in FIG. 2D.

Figure 3:
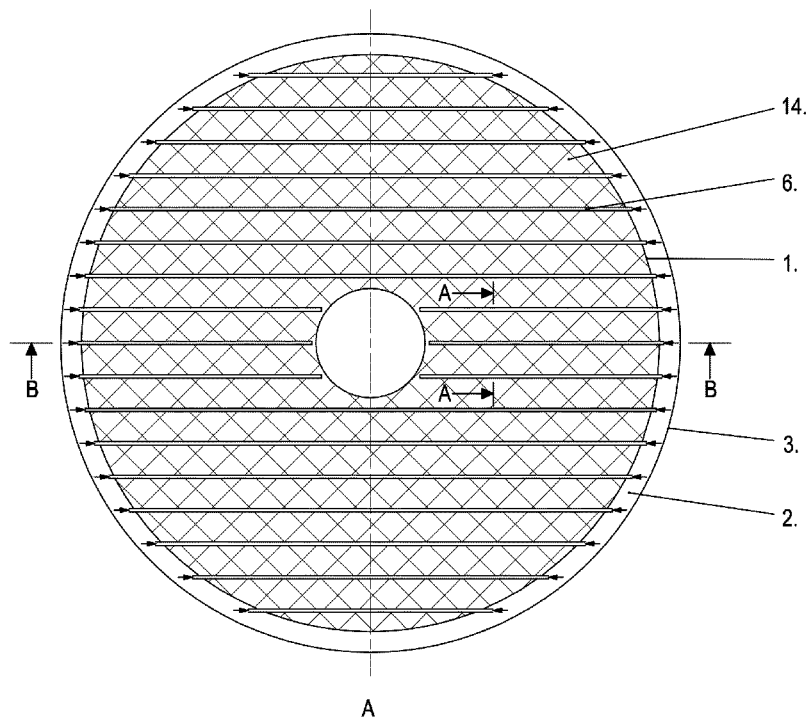
FIG. 3A shows an example of the cross section of a cylindrical catalyst module, containing a cooled catalyst zone and an intrabed heat exchanger. The intrabed heat exchanger consists in this figure of vertically aligned parallel cooling plates placed inside the cooled catalyst zone.
FIG. 3B shows a cross section of the cylindrical catalyst module according to the view A-A in FIG. 3A. Similarly.
FIG. 3C shows the cross section of two cylindrical catalyst modules according to the view B-B in FIG. 3A.
Figure 3:
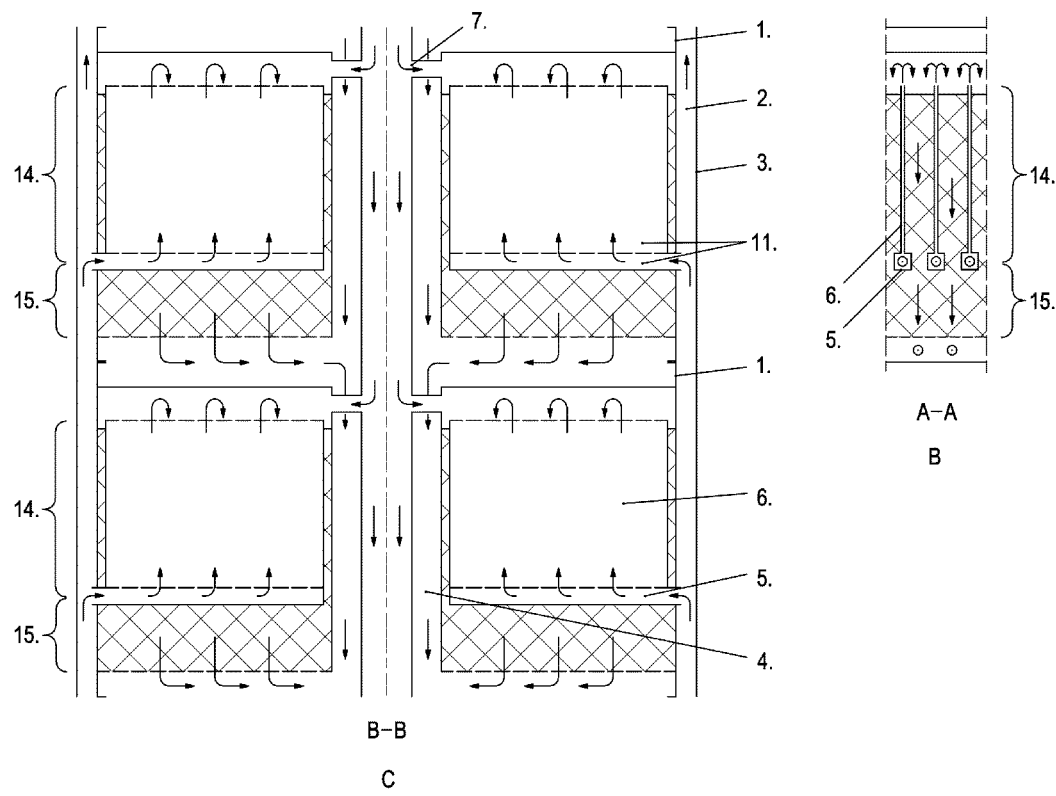

FIG. 3A shows the cross section of a cylindrical catalyst modules 1, containing a cooled catalyst zone 14. An outer annular space 2, is located in-between the outer pressure shell 3 and the cylindrical catalyst module 1. An intrabed heat exchanger, consisting of vertically aligned parallel cooling plates 6 and feed means (not shown), is placed inside the cooled catalyst zone 14. Arrows in FIG. 3A, pointing inwards on the cooling plates signifies the flow of fresh process gas from the outer annular space 2 into the intrabed heat exchanger.

FIG. 3B shows the cross section of the cylindrical catalyst module according to view A-A in FIG. 3A. This view shows that the module consists of a cooled catalyst zone 14 connected in series with an adiabatic catalyst zone 15 placed below the cooled catalyst zone. Fresh process gas is sent into the intrabed heat exchanger through the feed means 5. In this example of the invention the fresh process gas flows in upwards axial direction through the cooling plates, this flow being counter current relative to the axial downwards flow in the cooled catalyst zone 14. The catalyst zone 14 is cooled by heat exchange with the fresh process gas, being passed through the cooling plates 6. The partly converted process gas from the cooled catalyst zone flows in series to the adiabatic catalyst zone 15 of the catalyst module 1 where it is further converted into a product gas.

FIG. 3C shows the cross section of two cylindrical catalyst modules according to view B-B in FIG. 3A. Fresh process gas is introduced from an outer annular space 2 into heat exchange units 11, each consisting of feed means 5 and one cooling plate 6. The fresh process gas is distributed evenly along the width of the cooling plate 6 as it flows through the feed means 5. The fresh process gas then flows in upwards axial direction through the cooling plate during which it is preheated by taking up part of the reaction heat generated by the exothermic reaction taking place in the cooled catalyst zone 14 located in-between the cooling plates 6. In the present example, the preheated fresh process gas leaves the cooling plates in the top, turns around and flows axially downwards through first the gas cooled zone 14 followed by the adiabatic catalyst zone 15 before it is passed to the central space 4 from where it flows to the converter outlet (not shown). Also depicted is a direct inlet gas system 7 which serves the purpose of supplying preheated process gas to the catalyst loaded in the catalyst modules 1 during catalyst reduction and/or with the purpose of sending fresh non-preheated process gas to the upper catalyst zone, here 14, enabling control of the temperature level of the catalyst during normal operation. This direct inlet gas system 7 is arranged to bypass the outer annular space 2, and thereby avoiding to exceed the design temperature of the pressure shell 3 during catalyst reduction.

Figure 4:
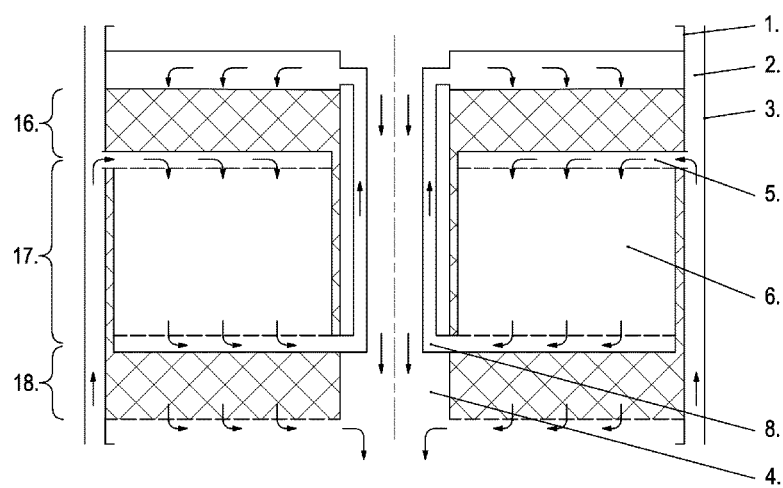
FIG. 4 shows another example of the cross section of a cylindrical catalyst module, this module holding two adiabatic catalyst zones connected in series with a single cooled catalyst zone.

FIG. 4 shows another arrangement covered by the invention. Here a catalyst module 1 is placed inside a pressure shell 3, this catalyst module containing an upper adiabatic catalyst zone 16 connected in series with a cooled catalyst zone 17 followed in series by another lower adiabatic catalyst zone 18. Fresh process gas flows from an outer annular space 2, into the feed means 5 wherein the fresh process gas is distributed along the width of the cooling plate 6. In contrast to FIG. 3, the fresh process gas in FIG. 4 is heated as it flows in downwards axial direction through the cooling plate 6. In order to be lead to the catalyst, transport means 8 are arranged to pass the preheated fresh process gas from the outlet of the cooling plate, to the upper adiabatic catalyst zone 16. In the present example, the flow of fresh process gas inside the cooling plate 6 is co-current with the flow of process gas in the cooled catalyst zone 17.

Finally, FIG. 5A to C show specific embodiments of the invention. Each figure illustrates a cylindrical catalyst module 1, containing a cooled catalyst zone and an intrabed heat exchanger, consisting of vertically aligned parallel cooling plates 6 and feed means (not shown here). An outer annular space 2, is located in-between the outer pressure shell 3 and the cylindrical catalyst module 1. In detail, FIG. 5A shows cooling plates with cylindrical layout, having constant distance between adjacent plates. In FIG. 5B, cooling plates are arranged in four 90° sections in the cylindrical catalyst module 1 wherein all cooling plates in each 90° section are planar and parallel. In FIG. 5C, cooling plates are arranged in three 120° sections in the cylindrical catalyst module 1 wherein all cooling plates in each 120° section are planar and parallel. In all three cases, the thickness of the catalyst layer located in-between two adjacent cooling plates are constant, as obtained by the preferred choice of parallel cooing plates. This ensures more homogeneous cooling of the catalyst in the cooled catalyst zone and consequently improved reaction conditions and catalytic efficiency relative to the reaction conditions obtained with the prior art.

Example

An investigation of the proposed concept of the invention was made for ammonia synthesis application with reference to the present 'state of the art' being a radial flow converter since it is presently the preferred choice for large scale ammonia plants. In detail, the methods of the invention were compared to a three bed radial flow converter having two interbed heat exchangers for preheating of fresh process gas and for cooling in-between the catalyst beds.

The converter, according to the invention, was equipped with a number of parallel operated cylindrical catalyst modules adjusted to give a total converter pressure drop below 1 kg/cm2. Each catalyst module consisted of a cooled catalyst zone, holding an intrabed heat exchanger, connected in series with an adiabatic catalyst zone. Axial flow through both catalyst zones of each catalyst module was utilized. The intrabed heat exchanger of each catalyst module consisted of parallel cooling plates proving constant catalyst layer thickness in the cooled catalyst zone. The size of the pressure shell, applied for the two converter types, was the same. Moreover, the loop pressure applied was equal and the same ammonia catalyst was considered in both cases.

The main results are listed in the below Table.

TABLE

| | Converter type | |
|---|---|---|
| Parameter | 'State of the art' radial flow converter | Converter according to the invention |
| Additional catalyst loading volume | — | 24% |
| Improvement of specific catalyst production rate | — | 4.5% |
| Additional converter capacity (production rate) | — | 30% |
| Pressure drop reduction | — | 64% |
| Reduction of maximum catalyst zone height | — | 75% |
| Reduction of catalyst bed weight | — | 53% |

The investigation shows that the methods of the present invention provide a number of value propositions compared to the prior art:

Better utilization of the available pressure shell volume is obtained and 24% more catalyst can be loaded into an identical pressure shell.

The specific catalyst production rate, in metric tons of ammonia produced per day per catalyst volume is improved by 4.5%, achieved by the parallel placed cooling plates in the cylindrical modules providing constant catalyst layer thickness and improved reaction conditions for the catalyst of the cooled catalyst zone.

The synergetic effect of the above two points ensures the ability to produce 30% extra ammonia within a fixed pressure shell. This is a significant achievement of value in both revamp scenarios as well as for grass root plants. Associated savings on investment cost will follow for the pressure shell.

The pressure drop over the converter was in the present investigation lowered by no less than 64% giving reduced operation costs and improved energy efficiency.

The maximum catalyst zone height was reduced by 75% providing significantly reduced catalyst forces on the mechanical parts and reduced risk of failures.

The catalyst bed weight was lowered by 53% obtained by the concept of catalyst modules operating in parallel. This eases the possibility of loading catalyst on ground, and installing the catalyst and hardware (modules) simultaneously by lifting the pre-loaded modules directly into the pressure shell for reduced installation time.

The invention claimed is:

1. Method of performing exothermic catalytic reactions comprising the steps of:
passing a fresh process gas in parallel to at least two cylindrical catalyst modules arranged in stacked order, each containing in series one or more catalyst zones, at least one of the catalyst zones is cooled by an intrabed heat exchanger;
exothermically reacting the fresh process gas flowing in axial flow direction through all of the catalyst zones to a product gas;
in each of the cylindrical catalyst modules, cooling the exothermic reacting process gas with the fresh process gas and thereby preheating the fresh process gas by passing the fresh process gas from an outer annular space formed around each of the cylindrical catalyst modules into the intrabed heat exchanger and passing the fresh process gas through the intrabed heat exchanger in indirect heat exchange with the exothermic reacting preheated process gas passing in axial flow direction through the cooled catalyst zone; and
collecting the product gas withdrawn from the at least two catalyst modules in a central space formed centrally within the at least two stacked catalyst modules.

2. The method of claim 1, wherein at least one of serial connected catalyst zones is an adiabatic catalyst zone.

3. The method of claim 1, wherein the process gas from a single cooled catalyst zone is passed in series through a single adiabatic catalyst zone.

4. The method of claim 1, wherein the intrabed bed heat exchanger comprises a plurality of cooling plates forming flow compartments for the fresh process gas in the intrabed heat exchanger.

5. The method of claim 4, wherein the thickness of the cooled catalyst layer between two adjacent cooling plates varies within ±10%.

6. The method of claim 5, wherein the thickness of the cooled catalyst layer between two adjacent cooling plates is between 10 and 300 mm.

7. The method of claim 6, wherein the thickness of the cooled catalyst layer between two adjacent cooling plates is between 20 and 150 mm.

8. The method of claim 5, wherein each of the cooling plate is essentially planar.

9. The method of claim 5, wherein the cooling plates are arranged in three 120° sections in the cylindrical catalyst modules and wherein all cooling plates in each 120° section are essentially planar and parallel.

10. The method of claim 9, wherein the essentially planar and parallel cooling plates in any of the three 120° sections are non-parallel to the essentially planar and parallel cooling plates in another section.

11. The method of claim 1, wherein the fresh process gas is passed through the intra bed heat exchanger in counter-current flow or in co-current flow with the process gas passing through the catalyst zones in each of the cylindrical catalyst modules.

12. The method of claim 1, wherein the fresh process gas is passed through the intrabed heat exchanger in counter-current flow with the process gas passing through the catalyst zones in each of the cylindrical catalyst modules.

13. The method of claim 1, wherein the cylindrical catalyst modules have the same size.

14. A reactor for performing exothermic reactions, comprising within a cylindrical pressure shell:
at least two parallel operated cylindrical catalyst modules arranged in stacked order, each containing in series one or more catalyst zones with a catalyst layer adapted to axial flow, the catalyst layer in the at least one of the catalyst zones is cooled by an intrabed heat exchanger;
an outer annular space between the cylindrical catalyst modules and the cylindrical pressure shell fluidly connected to the at least two parallel cylindrical catalyst modules;
in the at least one cooled catalyst zone feed means for the fresh process gas into the inlet of the intrabed heat exchanger, fluidly connected to the outer annular space;
the outlet of the intrabed heat exchanger is formed by open ends of the intrabed heat exchanger in the at least one cooled catalyst zone;
covers closing the at least two parallel cylindrical catalyst modules; and
outlet means from the at least two parallel cylindrical catalyst modules.

15. The reactor of claim 14, wherein the outlet means from the at least two parallel cylindrical catalyst modules is arranged in a central space formed centrally within the at least two stacked catalyst modules.

16. The reactor of claim 14, wherein at least one of the serial catalyst zones is an adiabatic catalyst zone.

17. The reactor of claim 14, having a single cooled catalyst zone connected in series with a single adiabatic zone.

18. The reactor of claim 14, wherein the intrabed bed heat exchanger is a plate heat exchanger with a plurality of cooling plates forming flow compartments for fresh process gas in the intrabed heat exchanger.

19. The reactor of claim 17, wherein the thickness of the cooled catalyst layer between two adjacent cooling plates varies within ±10%.

20. The reactor of claim 19, wherein the thickness of the cooled catalyst layer between two adjacent cooling plates is between 10 and 300 mm.

21. The reactor of claim 19, wherein the thickness of the cooled catalyst layer between two adjacent cooling plates is between 20 and 150 mm.

22. The reactor of claim 18, wherein each of the cooling plates is essentially planar.

23. The reactor of claim 18, wherein the cooling plates are arranged in three 120° sections in the cylindrical catalyst modules and wherein all cooling plates in each 120° section are essentially planar and parallel.

24. The reactor of claim 23, wherein the essentially planar and parallel cooling plates in any of the three 120° sections are non-parallel to the essentially planar and parallel cooling plates in another section.

25. The reactor of claim 14, wherein the cylindrical catalyst modules have the same size.

26. The reactor of claim 18, wherein the cooling plates are in the form of pillow plates.

27. The reactor of claim 14, wherein the inlet to the intrabed heat exchanger is provided with gas feed means fluidly connected to the outer annular space.

28. The reactor of claim 14, wherein the outlet means from the lower most catalyst zone in each of the at least two parallel operated cylindrical catalyst modules are fluidly connected to a space formed centrally within the at least two stacked catalyst modules.

29. The reactor of claim 14, wherein the reactor contains additional inlet means for supply of a further stream of preheated process gas.

30. The reactor of claim 29, wherein the means for supply of the further stream of preheated process gas is arranged to bypass the outer annular space and the intrabed heat exchanger.

31. The reactor of claim 14, wherein the reactor contains means for supply of a further stream of fresh process gas.

32. The reactor of claim 30, wherein the means for supply of the further stream of fresh process gas is arranged to bypass the outer annular space and the intrabed heat exchanger.

* * * * *